May 14, 1935. R. N. BURTON 2,001,408
AUTOMATIC EXTENSIBLE DRAWBAR
Filed July 21, 1933   3 Sheets-Sheet 1
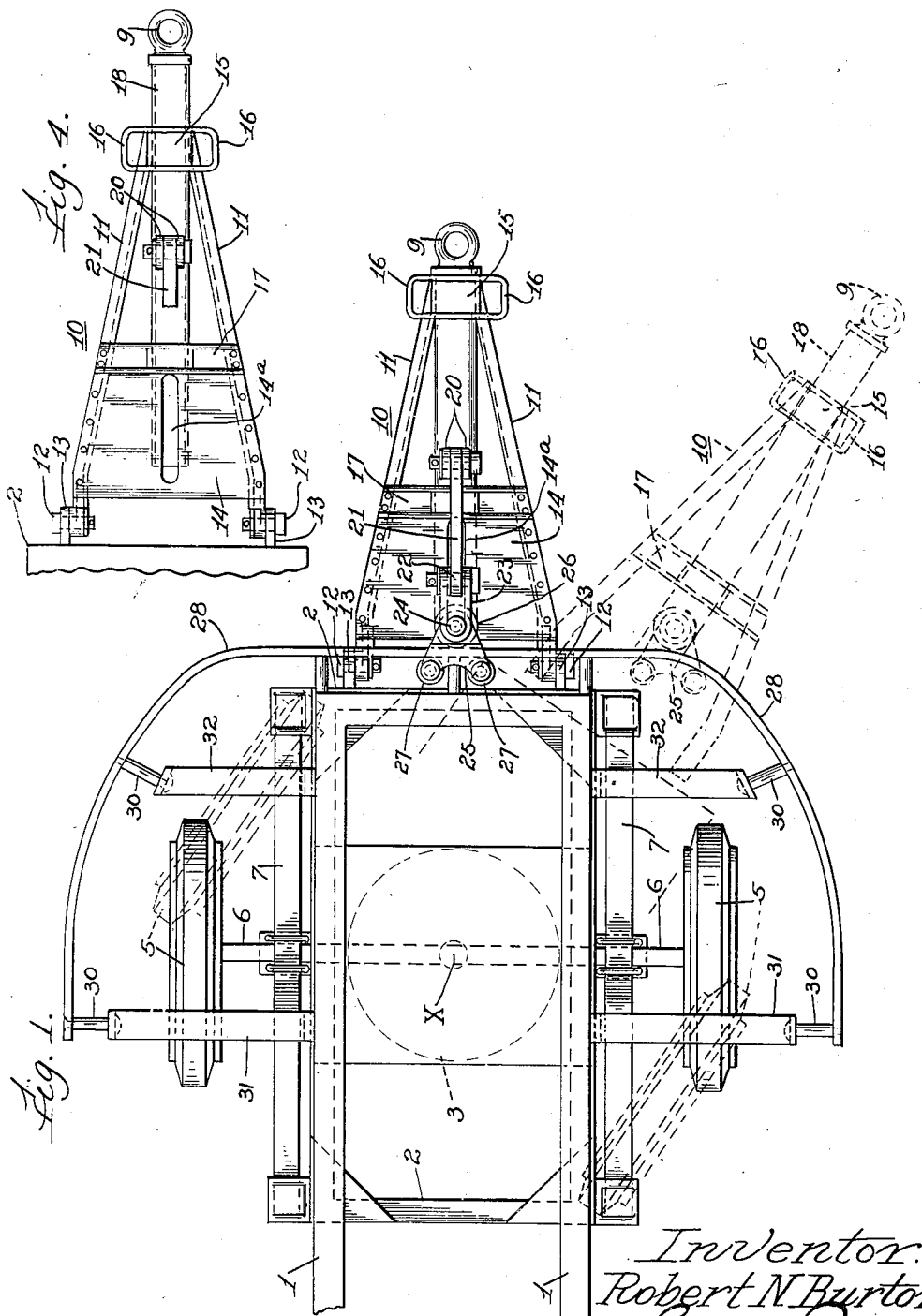

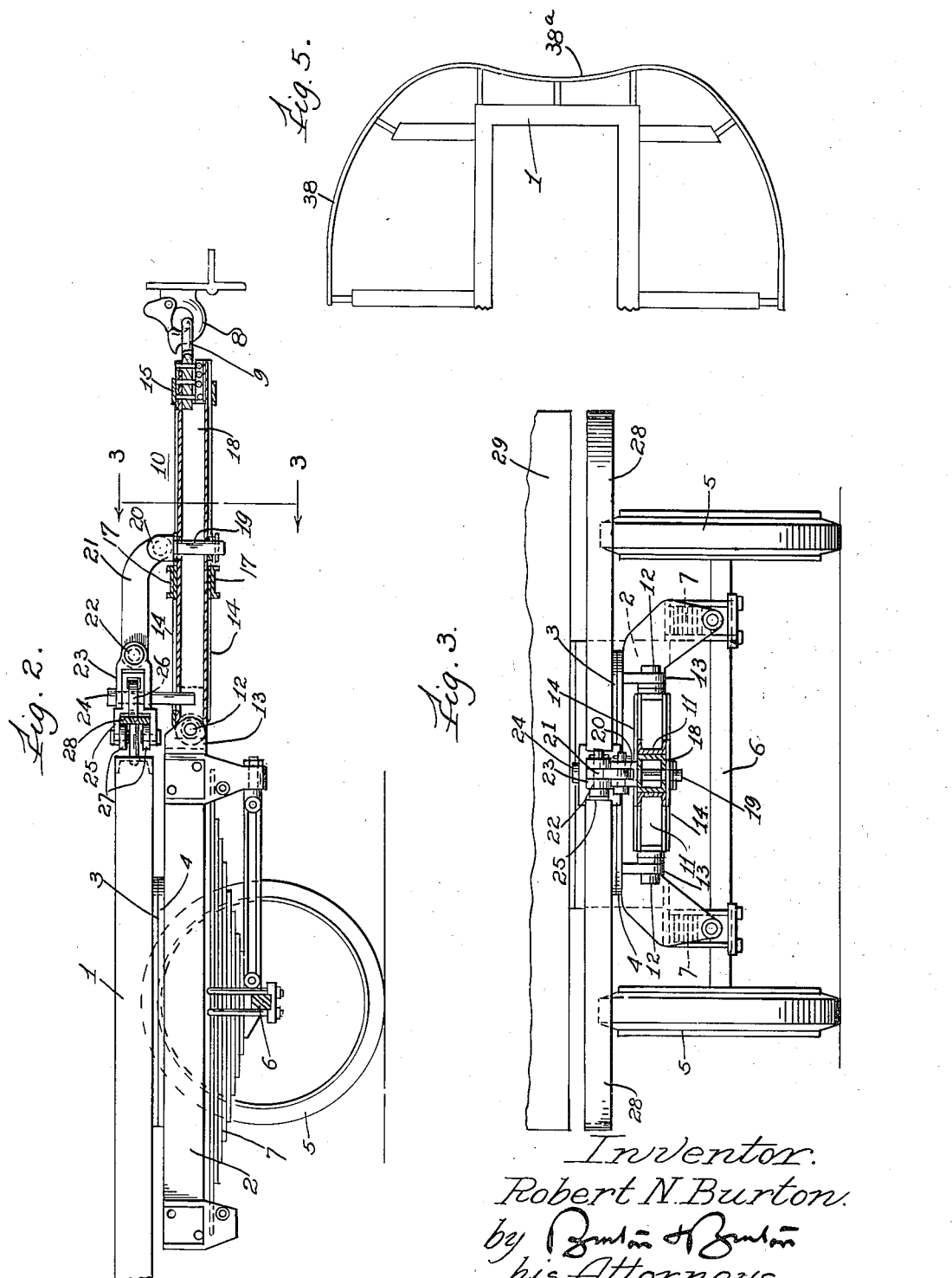

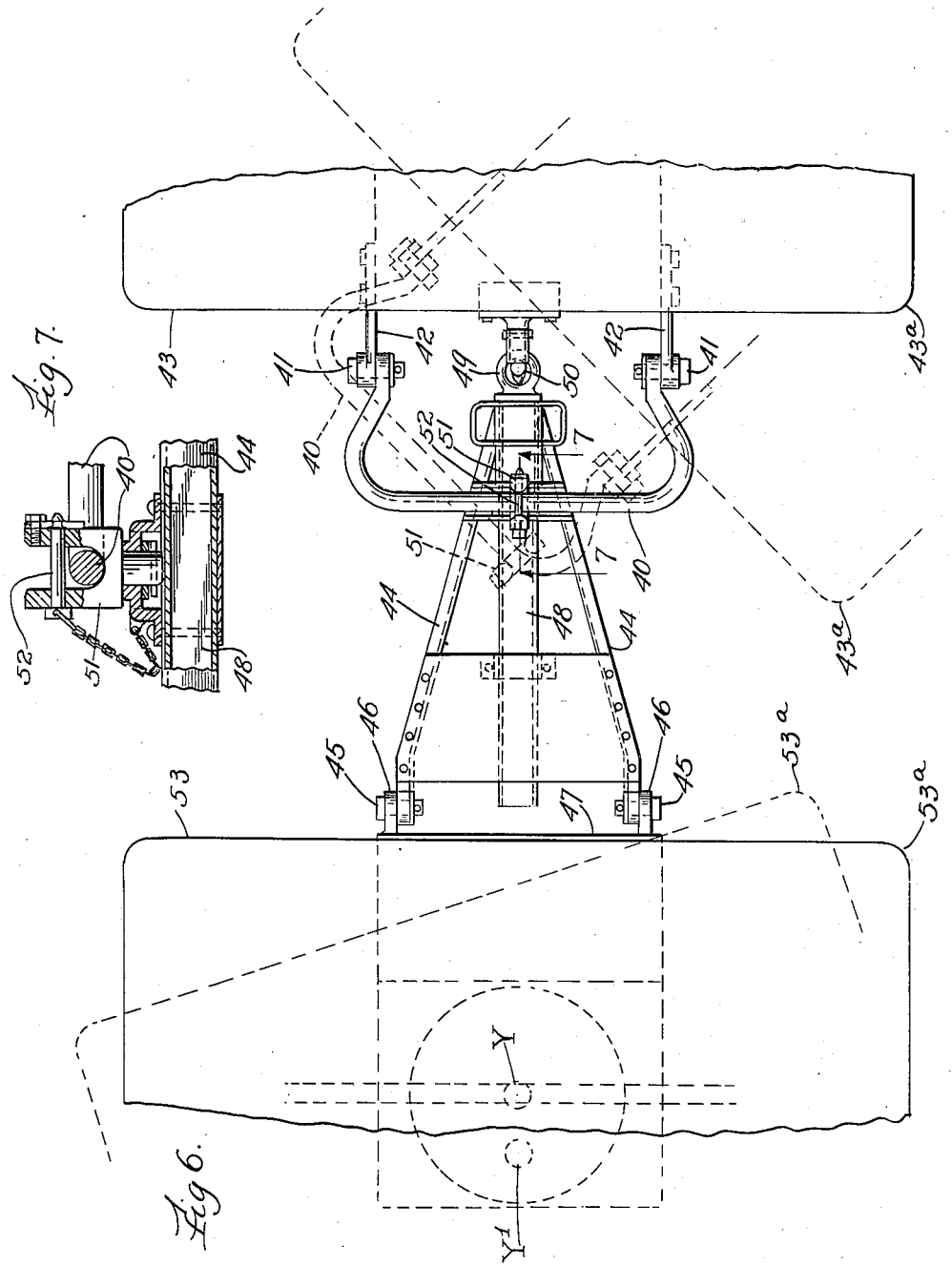

Patented May 14, 1935

2,001,408

UNITED STATES PATENT OFFICE 2,001,408

AUTOMATIC EXTENSIBLE DRAWBAR

Robert N. Burton, River Forest, Ill., assignor to Highway Trailer Company, Edgerton, Wis., a corporation of Wisconsin Application July 21, 1933, Serial No. 681,411

12 Claims. (Cl. 280—33.44)

This invention relates to draft rigging for trailer vehicles, and its purpose is to provide an adjustable draw bar serving to couple the trailer close to the tractor vehicle for straight-ahead travel, but arranged to be elongated automatically to afford more clearance between the vehicles as they negotiate a turn. The invention comprises certain features and elements of construction in combination as herein shown and described, and as indicated by the claims.

In the drawings:

Figure 1 is a top plan view showing the forward end of a trailer vehicle frame fitted with a draw bar embodying this invention.

Figure 2 is a side elevation of the same showing a portion of the draw bar structure in vertical section.

Figure 3 is a front elevation of the trailer vehicle including a fragmentary representation of the body, and showing the draw bar in section at the plane indicated at line 3—3 on Figure 2.

Figure 4 is a top plan view of the draw bar with a portion of the controlling linkage removed and with the draft head in extended position.

Figure 5 is a diagrammatic plan view showing a modified form of cam track.

Figure 6 is a plan view of a modified coupling arrangement.

Figure 7 is a detail section at line 7—7 on Figure 6.

The operation of road vehicles in the trains has been regulated by laws, which, in some localities, restrict the total length of the train so closely that in order to provide a maximum of load-carrying capacity within the permissible length it is necessary to couple the trailer vehicle quite close to the tractor vehicle. When both vehicles are equipped with large bodies of the van type which are usually so wide as to extend over the wheels and are generally somewhat higher than their width, the corners of the bodies will tend to interfere when the train rounds a curve, especially if there should be a dip in the roadway, as there is adjacent the curb at most street intersections. Therefore, while the close coupling is satisfactory for straight-away travel, it is quite desirable that more clearance be provided between the vehicles while they are turning a corner.

The drawings show the front end of a trailer having a frame structure comprising a main frame, 1, and a "dolly" frame, 2, which is connected to the main frame by a fifth wheel or turn table including upper and lower plates seen at 3 and 4. A pair of wheels, 5, and their axle, 6, are connected to the dolly frame, 2, through springs, 7; thus the swivel connection between the fifth wheel parts, 3 and 4, affords steering movement of the wheels, 5, with respect to the frame, 1. The trailer is arranged to be drawn by a leading vehicle equipped with any suitable form of coupling, such as the pintle hook 8, seen in Figure 2, engaging draft means which includes the ring or eye, 9, of a draw bar, indicated generally by the numeral, 10. The draw bar structure which includes an element hereinafter described and referred to as the draft member, constitutes the draft connection between the leading vehicle and the trailer. The draw bar is shown as comprising forwardly converging side members, 11, which are pivoted at 12 to ears or lugs, 13, projecting from the front face of the dolly frame, 2, and since the draw bar is thus connected to the dolly frame, 2, said dolly frame constitutes a part of the draft means through which the pull of the leading vehicle is transmitted to the trailer; and the pivotal connection of the dolly frame, 2, to the main frame, 1, at its fifth wheel serves as a pivotal connection between the draft means and said main frame so that the draw bar, 10, is thus adapted to swing laterally about the substantially vertical axis of the fifth wheel pivot for effecting steering movement or adjustment of the wheels, 5, with respect to the frame, 1. Adjacent these pivotal connections the members, 11, are tied together by plates, 14, secured to their upper and lower flanges respectively, and at their forward ends the members are secured to a terminal casting, 15, which is formed with an opening extending in fore-and-aft direction for slidably engaging the draft member, 18, as seen in Figure 2, and which may include hand holds, 16, for manipulating the draw bar in coupling it to the pintle hook, 8. Further reinforcement may be provided in the form of transverse channels, 17, connecting the members, 11, intermediate their ends, and supporting guide means for the longitudinally slidable draft member, 18, which carries the ring, 9, at its outer end.

The draft member, 18, carries a vertical pin, 19, swivelly mounted in the member intermediate its ends, and having a specially formed head which includes spaced lugs, 20, between which there is pivotally secured the forward end of a drag link, 21. The rear end of the link is connected by a horizontal pivot, 22, to a yoke, 23, which is attached by a vertical pivot, 24, to a follower or control carriage, 25, comprising upper and lower plates between which there are journaled the guide wheels, 26 and 27, seen in Figure 1. Between the wheel, 26, and the wheels, 27, there extends a cam track, 28, which is secured to the main frame, 1, of the vehicle and spaced away from it by any suitable structure, such as that seen in Figure 1, including spacer sleeves, 30, and laterally extending arms, 31 and 32. As shown in Figure 1, this track, 28, extends transversely of the vehicle and parallel to its forward end for something more than the width of the frame 1; then its end portions are bent rearwardly. The curvature of these bent portions is such that successive points (rearwardly) are located farther and farther from the center of the fifth wheel denoted at X in Figure 1,— this being the center about which the truck or dolly, 2, turns for steering movement, and about which the draw bar, 10, swings in causing such steering movement.

As the draft member thus swings about the center X, toward the position indicated in dotted lines in Figure 1, the follower or control carriage, 25, traversing first the straight portion of the track, 28, and then the bent or curved portion, is shifted forwardly with respect to the draw bar, 10, and the draft member, 18, by reason of its connection through link, 21, with the carriage, 25, is also shifted forwardly with respect to the remainder of the draw bar structure. Thus, automatically, the effective length of the draw bar is increased as the draw bar swings laterally away from its straight-ahead position, and the effective distance between the vehicles is increased enough to avoid interference between the corner portions of their bodies as they travel in a curved path. As the vehicles resume straight-line travel, the draw bar springs back to its normal central position, and its length is automatically restored to the minimum, which keeps the length of the train within the required legal limit. Preferably, to maintain the follower, 25, in proper relation with the draw bar, 10, the upper plate, 14, is formed with a longitudinal slot, 14a, and a pivot, 24, which connects the yoke, 23, with the follower, 25, and also serves to journal the wheel, 26, extends downwardly into the slot, 14a, and travels forwardly in it when the draw bar swings laterally.

It may be understood that the dolly frame, 2, is usually provided with stops, not shown, tending to check its rotation about the axis, X, at approximately the position indicated in dotted lines in Figure 1, so that in practice the follower, 25, will not ordinarily traverse the entire length of the track, 28,—particularly the end portions which extend around parallel to the sides of the body, 29. However, since the draw bar, 10, may be removed by removal of the pivot pins, 12, and shifted to the opposite end of the trailer, if desired, it will be convenient to remove the follower with the draw bar by simply running it around the track, 28, at one side or the other, and off the end of the track after the draw bar has been thus disconnected from the dolly frame, 2.

It may also be noted that the horizontal pivotal connection between the lugs, 20, of the pin, 19, and the horizontal pivot at 22, permit up and down movement of the draw bar, 10, about its pivots, 12, as the vehicles traverse uneven ground; any considerable vertical movement will be compensated by some longitudinal movement of the draft member, 18, in its guideways in the draw bar structure, 10, although such longitudinal movement will be slight compared to that which results from the lateral swing of the draw bar and the resulting control of the draft member, 18, by the cam track, 28.

Figure 5 shows a modified form of cam track, 38, which has a re-entrant curve at the middle portion, 38a, bringing this portion closer to the frame, 1, at the middle than at the corners of the frame. Such formation of the track will result in somewhat greater longitudinal adjustment of the draft member, 18, and its eye, 19, with respect to the front end of the vehicle.

Figure 6 shows a further modification of the invention in which the controlling cam track is carried by the tractor vehicle instead of by the trailer. This element is represented at 40 as a bent bar, preferably of round cross-section, hinged at 41 to brackets, 42, extending rearwardly from the opposite side members of the tractor frame. The outline of the body is shown at 43 extending laterally some distance beyond these brackets. The trailer draw bar is quite similar to that shown in 41, and includes a triangular frame having side members, 44, hinged at 45 to lugs, 46, extending forwardly from the dolly frame, 47, of the trailer. A longitudinally slidable draft member, 48, is carried in the triangular frame of the draw bar and is provided at its forward end with an eye, 49, engaging the usual type of pintle hook, 50, which extends from the rear end of the tractor truck.

Instead of the control linkage shown in Figure 1, the draw bar of Figure 6 carries a vertically swivelled follower, 51, in the form of an upwardly open yoke in which the cam bar, 40, is lodged, and in which it is retained by a keeper pin, 52, as shown in detail in Figure 7. As the truck starts to turn a corner, the angular relation of its frame to the draw bar changes, and this shifts the cam bar, 40, through the follower, 51, changing the distance of the latter from the pintle hook, 50, and forcing the slidable draft member, 48, to move forward with respect to the draw bar frame. In effect, this elongates the draw bar so as to space the body, 53, of the trailer farther from the body, 43, of the truck than when both vehicles are traveling along a straight path; and such additional spacing provides more clearance for the corners, 43a and 53a, as they approach each other when the vehicles travel in a curve.

Figure 6 indicates in dotted lines the position of the cam bar, 40, when the tractor truck has turned at a considerable angle to the draw bar of the trailer, and shows that as compared with the straight-ahead position, the follower, 51, has been moved rearward. Since the follower is on the draw bar frame, and the latter is hinged at 45 to the dolly frame of the trailer, the effect is as though the king pin Y, of the trailer were moved rearward to the position marked at Y1, on Figure 6, carrying with it the trailer body, and thus separating the truck and trailer bodies by a corresponding distance. With this arrangement the vehicles are returned to their normal spacing automatically as they resume straight-ahead travel. It will be obvious that if a greater range of extensibility were required for the draw bar, the cam bar, 40, could be extended laterally beyond the width shown in Figure 7, or could be curved in accordance with the principle indicated in Figure 5 to cause a more rapid change in the effective length of the draw bar. It will be understood that with this construction the actual draft is transmitted through the cam bar, 40, and the pintle hook, 50, becomes principally a guide for the forward end of the draft member, 48.

While there are shown and described herein certain specific structures embodying the invention, it will be manifest to those skilled in the art that various modifications and re-arrangements of the parts may be made without departing from the spirit and the scope of the invention, and that the same is not limited to the particular forms herein shown and described, except in so far as indicated by the appended claims.

I claim:

1. In a trailer vehicle having a main frame and dirigible wheels associated therewith, draft means pivotally connected to said frame for lateral movement and connected for effecting steering adjustment of said wheels by such movement, said draft means including a draw bar having a draft member mounted for longitudinal movement in the draw bar, and means arranged to control such longitudinal movement in response to steering movement of the draw bar.

2. Draft means for connecting two vehicles arranged for pivotal attachment to each of them at approximately vertical axes to permit steering movement of said vehicles with respect to each other, said draft means including a draw bar and a draft member mounted for longitudinal movement in the draw bar structure, and means arranged to control such longitudinal movement in response to movement of the draft means about its pivotal connection to one of the vehicles.

3. In a trailer vehicle having a main frame and dirigible wheels associated therewith, draft means pivotally connected to said frame for lateral movement and connected for effecting steering adjustment of said wheels by such movement, said draft means including a draw bar having a draft member mounted for longitudinal movement in the draw bar, and means actuated by the steering movement of the draw bar to extend said draft member relatively to said main frame when the draw bar swings away from the middle position of its range of movement about said pivotal connection of the draft means to the frame.

4. In a trailer vehicle having a main frame and dirigible wheels associated therewith, draft means pivotally connected to said frame for lateral movement and connected for effecting steering adjustment of said wheels by such movement, said draft means including a draw bar having a draft member mounted for longitudinal movement in the draw bar, and means actuated by said lateral movement of the draft means to extend said draft member from the draw bar and relatively to said frame in accordance with the angular deflection of the draft means from the middle portion of its steering range.

5. In a trailer vehicle having a main frame and dirigible wheels associated therewith, draft means pivotally connected to said frame for lateral movement and connected for effecting steering adjustment of said wheels by such movement, said draft means including a draw bar having a draft member mounted for longitudinal movement in the draw bar, a cam track rigidly associated with said main frame, a follower mounted on the cam track for movement transversely of the vehicle in response to steering movement of the draft means, and a link connecting said follower to the draft member for automatically shifting the latter longitudinally of the draw bar under control of the cam track.

6. In a trailer vehicle having a main frame, an axle associated therewith for steering movement, draft means pivotally connected to said frame and arranged for controlling said steering movement of the axle, and means for varying the effective length of said draft means concurrently with said steering movement.

7. In a trailer vehicle having a main frame, a dolly truck comprising wheels, an axle therefor and a dolly truck frame mounted on the axle, said dolly truck frame being pivotally connected to the main frame for steering movement of the axle, a draw bar attached to the dolly frame and including a draft member mounted for longitudinal movement in the draw bar, and means on the main frame connected with said draft member and operable by the steering movement of the draw bar relative to the main frame for automatically extending said draft member outwardly with respect to the main frame when the draw bar swings away from the middle position of its range.

8. In a trailer vehicle having a main frame, a dolly truck comprising wheels, an axle therefor and a dolly truck frame mounted on the axle, said dolly truck frame being pivotally connected to the main frame for steering movement of the axle, a draw bar attached to the dolly frame, a cam track carried transversely on the main frame, said draw bar including a portion which is longitudinally extensible, and follower means on the cam track connected to said portion for extending it automatically when the draw bar swings away from the middle position of its range in the steering movement of the axle.

9. Draft means for connecting two vehicles arranged for pivotal attachment to one of them to permit lateral movement of said draft means about such pivot, said means including a draft member mounted for longitudinal movement in the draft structure, and means connecting said draft member with a part of said vehicle to which the draft means is pivotally attached, said connecting means being arranged and constructed for causing longitudinal movement of the draft member in the draft structure in response to swinging movement of the latter about its pivotal connection to the vehicle.

10. In a trailer vehicle having a main frame, draft means connected to the frame for horizontal movement about a vertical pivot to effect steering movement of the vehicle and including a draw bar pivoted for vertical movement, said draw bar including a draft member mounted for longitudinal sliding adjustment in the draw bar, and means to control such adjustment in response to the steering movement comprising a link connected to said draft member by a horizontal pivot, and means on said main frame movable transversely thereon in response to the steering movement of the draft means, said link being connected also to said transversely movable means by a horizontal pivot to accommodate itself to the vertical movement of the draw bar.

11. Draft means for coupling two vehicles together comprising a longitudinally extensible connection for varying the distance between the connected vehicles and including two parts, one of which is pivotally connected to one of the vehicles while the other is pivotally connected to the other vehicle to provide for steering movement of the vehicles with respect to each other, and means on one vehicle arranged to control the longitudinal extension of said draft means in response to the change of angular relation thereof to one or both vehicles in the steering movement.

12. Draft means for coupling two vehicles together including a two-part connection which is longitudinally extensible to vary the distance between the connected vehicles, one part of the draft means being pivotally connected to one of the vehicles and another part being pivotally connected to the other vehicle to provide for steering movement of the vehicles relatively to each other, and means on the one vehicle movable transversely of the direction in which the draft means is extensible and in response to steering movement of the vehicle, said transversely movable means being connected to the part of the draft means which is attached to the other vehicle, and being operative for varying the effective length of the draft means in response to said steering movement.

ROBERT N. BURTON.